US012757196B2

(12) United States Patent
Zhou et al.

(10) Patent No.: US 12,757,196 B2
(45) Date of Patent: Oct. 6, 2026

(54) UE BEHAVIOR IN RECEIVING APERIODIC REFERENCE SIGNALS

(71) Applicant: QUALCOMM Incorporated, San Diego, CA (US)

(72) Inventors: Yan Zhou, San Diego, CA (US); Konstantinos Dimou, New York, NY (US); Tao Luo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 678 days.

(21) Appl. No.: 18/018,533

(22) PCT Filed: Sep. 20, 2021

(86) PCT No.: PCT/US2021/051119

§ 371 (c)(1),
(2) Date: Jan. 27, 2023

(87) PCT Pub. No.: WO2022/061239

PCT Pub. Date: Mar. 24, 2022

(65) Prior Publication Data

US 2023/0300837 A1 Sep. 21, 2023

(30) Foreign Application Priority Data

Sep. 21, 2020 (GR) .............................. 20200100568

(51) Int. Cl.
*H04W 72/1273* (2023.01)
*H04B 7/06* (2006.01)
(Continued)

(52) U.S. Cl.
CPC ...... *H04W 72/1273* (2013.01); *H04B 7/0626* (2013.01); *H04W 16/28* (2013.01); *H04W 72/232* (2023.01); *H04W 72/512* (2023.01)

(58) Field of Classification Search
CPC ............. H04W 72/1273; H04W 16/28; H04W 72/232; H04W 72/512; H04B 7/0626
See application file for complete search history.

(56) References Cited

U.S. PATENT DOCUMENTS 11,101,965 B2 8/2021 Huang et al.
2020/0280409 A1* 9/2020 Grant .................... H04L 5/0044
(Continued)

FOREIGN PATENT DOCUMENTS

CN 110999468 A 4/2020
WO 2020076961 4/2020
WO 2020170449 A1 8/2020

OTHER PUBLICATIONS

International Search Report and Written Opinion—PCT/US2021/051119—ISA/EPO—Jan. 11, 2022.
(Continued)

*Primary Examiner* — Jackie Zuniga Abad
(74) *Attorney, Agent, or Firm* — ArentFox Schiff, LLP

(57) ABSTRACT

In some aspects, a UE may receive downlink control information (DCI) indicating a first transmission of a plurality of AP-CSI-RSs and indicating a second transmission of downlink data. The UE may receive the plurality of AP-CSI-RSs and the downlink data, the reception of the plurality of AP-CSI-RSs indicating to the UE to transmit an AP-CSI report based on receiving the plurality of AP-CSI-RSs. However, the plurality of AP-CSI-RSs may be received across multiple symbols. As a result, some of the AP-CSI-RSs may be outdated after the UE receives the AP-CSI-RSs or the downlink data. The UE may refrain from transmitting an AP-CSI report in response to receiving the plurality of AP-CSI-RSs based on at least one of a change in a channel condition of a physical downlink shared channel (PDSCH) for receiving the downlink data or receiving the downlink data.

27 Claims, 9 Drawing Sheets

(51) Int. Cl.

| | |
|---|---|
| ***H04W 16/28*** | (2009.01) |
| ***H04W 72/232*** | (2023.01) |
| ***H04W 72/512*** | (2023.01) |

(56) References Cited

U.S. PATENT DOCUMENTS

2020/0296697 A1* 9/2020 Hwang ............. H04W 74/0833
2021/0160881 A1* 5/2021 Rahman ................ H04L 5/0051
2022/0007399 A1* 1/2022 Rastegardoost ...... H04L 1/1861
2023/0362701 A1* 11/2023 Lee ....................... H04W 24/10

OTHER PUBLICATIONS

Kaikkonen J., et al., "Main Radio Interface Related System Procedures," Apr. 24, 2020 (Apr. 24, 2020), XP055845846, 136 Pages, Retrieved from the Internet: URL:https://onlinelibrary.wiley.com/doi/pdfdirect/10.1002/9781119582335.ch4 [retrieved on Sep. 29, 2021], Section 4.4, p. 1-p. I, Sections 4.2.4.3, 4.3.2.8.7, 4.3.2.9, 4.3.3.2.3, 4.3.5, and 4.5.1, Figures 4.58-4.59, Table 4.16, p. 302-p. 303, p. 328, p. 342-p. 344.

Samsung: "LAA CSI Reporting", 3GPP TSG RAN WG1 Meeting #83, R1-156772, 3rd Generation Partnership Project, Mobile Competence Centre, 650, Route Des Lucioles, F-06921 Sophia-Antipolis Cedex, France, vol. RAN WG1, No. Anaheim, USA, Nov. 15, 2015-Nov. 22, 2015, Nov. 7, 2015, XP051022496, pp. 1-4.

ZTE: "Leftover Issues on Aperiodic CSI-RS", 3GPP Draft, R1-1904029, 3GPP TSG RAN WG1 Meeting #96bis, Leftover Issues on Aperiodic CSI-RS, 3rd Generation Partnership Project (3GPP), Mobile Competence Centre, 650, Route Des Lucioles, F-06921 Sophia-Antipolis Cedex, France, vol. RAN WG1, No. Xi'an, China, Apr. 8, 2019-Apr. 12, 2019, Mar. 30, 2019 (Mar. 30, 2019), XP051691243, 4 Pages, p. 2, p. 1-p. 2 figure 1b.

LG Electronics: "Discussion on Aperiodic CSI Report Timing and Relaxation", 3GPP TSG RAN WG1 Meeting #92, R1-1802192, Athens, Greece, Feb. 26-Mar. 2, 2018, Feb. 16, 2018, 6 Pages.

* cited by examiner

UE BEHAVIOR IN RECEIVING APERIODIC REFERENCE SIGNALS

CROSS REFERENCE TO RELATED APPLICATIONS

This application is a National Phase entry of PCT Application No. PCT/US2021/051119, entitled "UE BEHAVIOR IN RECEIVING APERIODIC REFERENCE SIGNALS" and filed on Sep. 20, 2021, which claims priority of Greek application No. 20200100568, entitled "UE BEHAVIOR IN RECEIVING APERIODIC REFERENCE SIGNALS" and filed on Sep. 21, 2020, both of which are expressly incorporated by reference herein in their entirety.

BACKGROUND

Technical Field

The present disclosure relates generally to wireless communication, and more particularly, to receiving aperiodic (AP) reference signals (RSs) and determining whether to report channel state information based on channel conditions, and specifically, changes in the channel conditions.

INTRODUCTION

Wireless communication systems are widely deployed to provide various telecommunication services such as telephony, video, data, messaging, and broadcasts. Typical wireless communication systems may employ multiple-access technologies capable of supporting communication with multiple users by sharing available system resources. Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example telecommunication standard is 5G New Radio (NR). 5G NR is part of a continuous mobile broadband evolution promulgated by Third Generation Partnership Project (3GPP) to meet new requirements associated with latency, reliability, security, scalability (such as with Internet of Things (IoT)), and other requirements. 5G NR includes services associated with enhanced mobile broadband (eMBB), massive machine type communications (mMTC), and ultra reliable low latency communications (URLLC). Some aspects of 5G NR may be based on the 4G Long Term Evolution (LTE) standard. There exists a need for further improvements in 5G NR technology.

A base station (BS) may allocate downlink resources to a user equipment (UE) for aperiodic reference signals (AP RSs), for example, for use in determining channel conditions, or changes in the channel conditions, of a transmission channel. However, the AP RSs may be transmitted over multiple symbols, and the state or conditions of the transmission channel or beam configurations may change between the beginning of transmission and the end of transmission. When the UE transmits a report associated with the AP RSs, a portion of the contents may be outdated.

Improvements are presented herein. These improvements may also be applicable to other multi-access technologies and the telecommunication standards that employ these technologies.

SUMMARY

The following presents a simplified summary of one or more aspects in order to provide a basic understanding of such aspects. This summary is not an extensive overview of all contemplated aspects, and is intended to neither identify key or critical elements of all aspects nor delineate the scope of any or all aspects. Its sole purpose is to present some concepts of one or more aspects in a simplified form as a prelude to the more detailed description that is presented later.

In an aspect of the disclosure, a method, a computer-readable medium, and an apparatus are provided. Aspects of the present disclosure include methods by a user equipment (UE) for receiving downlink control information (DCI) indicating a first transmission of a plurality of aperiodic (AP) channel state information (CSI) reference signals (AP-CSI-RSs) and indicating a second transmission of downlink data, receiving the plurality of AP-CSI-RSs and the downlink data, the reception of the plurality of AP-CSI-RSs indicating to the UE to transmit an AP-CSI report based on receiving the plurality of AP-CSI-RSs, and refraining from transmitting the AP-CSI report in response to receiving the plurality of AP-CSI-RSs based on at least one of a change in a channel condition of a physical downlink shared channel (PDSCH) for receiving the downlink data or receiving the downlink data.

Any of the methods above, wherein the downlink data is associated with an ultra-reliable low-latency communication (URLLC) session.

Any of the methods above, wherein the DCI includes a downlink control indicator that indicates the first transmission of the plurality of AP-CSI-RSs.

Any of the methods above, wherein the DCI includes a radio resource control (RRC) parameter that indicates whether the UE is to perform a UE receive beam refinement process based on a time between a last-in-time AP-CSI-RS of the plurality of AP-CSI-RSs and receiving the downlink data exceeding a time gap or perform a PDSCH parameter update process based on the plurality of AP-CSI-RSs.

Any of the methods above, wherein the RRC parameter is a repetition parameter or a tracking reference signal information (TRS-info) parameter.

Any of the methods above, further comprising, based on the RRC parameter being the repetition parameter, performing the UE receive beam refinement process on one or more UE receive beams based on the plurality of AP-CSI-RSs, wherein the downlink data is received using at least a portion of the one or more UE receive beams after the UE receive beam refinement process Any of the methods above, further comprising, based on the RRC parameter being the TRS-info parameter, determining one or more quasi-co-located (QCL) channel properties of a QCL channel based on the plurality of AP-CSI-RSs, wherein the QCL channel is quasi-co-located with a PDSCH for receiving the downlink data and updating one or more PDSCH channel parameters based on determining the one or more PDSCH channel properties, wherein the downlink data is received via the PDSCH channel after updating the one or more PDSCH channel parameters.

Any of the methods above, wherein the one or more PDSCH channel properties include at least one of a delay spread, a Doppler spread, an average delay, or a Doppler shift.

Any of the methods above, wherein a last-in-time AP-CSI-RS of the plurality of AP-CSI-RSs is received before receiving a first resource of the downlink data.

Any of the methods above, further comprising determining whether a time gap between the last AP-CSI-RS of the plurality of AP-CSI-RSs and the first resource of the downlink data is greater than, equal to, or less than a threshold time gap.

Any of the methods above, further comprising receiving, based on the time gap being greater than or equal to the threshold time gap, the downlink data via a PDSCH channel configured based on at least one of the plurality of AP-CSI-RSs, or receiving, based on the time gap being less than the threshold time gap, the downlink data via a PDSCH channel that is not configured based on the plurality of AP-CSI-RSs.

Other aspects of the present disclosure include a UE having a memory comprising instructions, a transceiver, and one or more processors operatively coupled with the memory and the transceiver, the one or more processors configured to execute instructions in the memory to receive DCI indicating a first transmission of a plurality of AP-CSI-RSs and indicating a second transmission of downlink data, receive the plurality of AP-CSI-RSs and the downlink data, the reception of the plurality of AP-CSI-RSs indicating to the UE to transmit an AP-CSI report based on receiving the plurality of AP-CSI-RSs, and refrain from transmitting an AP-CSI report in response to receiving the plurality of AP-CSI-RSs based on at least one of a change in a channel condition of a PDSCH for receiving the downlink data or receiving the downlink data.

Any of the UEs above, wherein the downlink data is associated with an URLLC session.

Any of the UEs above, wherein the DCI includes a downlink control indicator that indicates the first transmission of the plurality of AP-CSI-RSs.

Any of the UEs above, wherein the DCI includes a RRC parameter that indicates whether the UE is to perform a UE receive beam refinement process based on a time between a last-in-time AP-CSI-RS of the plurality of AP-CSI-RSs and receiving the downlink data exceeding a time gap or perform a PDSCH parameter update process based on the plurality of AP-CSI-RSs.

Any of the UEs above, wherein the one or more processors are further configured to perform, based on the RRC parameter being the repetition parameter, the UE receive beam refinement process on one or more UE receive beams based on the plurality of AP-CSI-RSs, wherein the downlink data is received using at least a portion of the one or more UE receive beams after the UE receive beam refinement process Any of the UEs above, wherein the one or more processors are further configured to, based on the RRC parameter being the TRS-info parameter, determine one or more QCL channel properties of a QCL channel based on the plurality of AP-CSI-RSs, wherein the QCL channel is quasi-co-located with a PDSCH for receiving the downlink data, and update one or more PDSCH channel parameters based on determining the one or more PDSCH channel properties, wherein the downlink data is received via the PDSCH channel after updating the one or more PDSCH channel parameters.

Any of the UEs above, wherein the one or more PDSCH channel properties include at least one of a delay spread, a Doppler spread, an average delay, or a Doppler shift.

Any of the UEs above, wherein a last-in-time AP-CSI-RS of the plurality of AP-CSI-RSs is received before receiving a first resource of the downlink data.

Any of the UEs above, wherein the one or more processors are further configured to determine whether a time gap between the last AP-CSI-RS of the plurality of AP-CSI-RSs and the first resource of the downlink data is greater than, equal to, or less than a threshold time gap.

Any of the UEs above, wherein the one or more processors are further configured to receive based on the time gap being greater than or equal to the threshold time gap, the downlink data via a PDSCH channel configured based on at least one of the plurality of AP-CSI-RSs, or receive based on the time gap being less than the threshold time gap, the downlink data via a PDSCH channel that is not configured based on the plurality of AP-CSI-RSs.

An aspect of the present disclosure includes a UE including means for receiving DCI indicating a first transmission of a plurality of AP-CSI-RSs and indicating a second transmission of downlink data, means for receiving the plurality of AP-CSI-RSs and the downlink data, the reception of the plurality of AP-CSI-RSs indicating to the UE to transmit an AP-CSI report based on receiving the plurality of AP-CSI-RSs, and means for refraining from transmitting the AP-CSI report in response to receiving the plurality of AP-CSI-RSs based on at least one of a change in a channel condition of a PDSCH for receiving the downlink data or receiving the downlink data.

Any of the UEs above, wherein the downlink data is associated with an URLLC session.

Any of the UEs above, wherein the DCI includes a downlink control indicator that indicates the first transmission of the plurality of AP-CSI-RSs.

Any of the UEs above, wherein the DCI includes a RRC parameter that indicates whether the UE is to perform a UE receive beam refinement process based on a time between a last-in-time AP-CSI-RS of the plurality of AP-CSI-RSs and receiving the downlink data exceeding a time gap or perform a PDSCH parameter update process based on the plurality of AP-CSI-RSs.

Any of the UEs above, wherein the RRC parameter is a repetition parameter or a tracking reference signal information (TRS-info) parameter Any of the UEs above, further comprising means for performing the UE receive beam refinement process on one or more UE receive beams based on the plurality of AP-CSI-RSs, wherein the downlink data is received using at least a portion of the one or more UE receive beams after the UE receive beam refinement process Any of the UEs above, further comprising means for determining one or more QCL channel properties of a QCL channel based on the plurality of AP-CSI-RSs, wherein the QCL channel is quasi-co-located with a PDSCH for receiving the downlink data, and means for updating one or more PDSCH channel parameters based on determining the one or more PDSCH channel properties, wherein the downlink data is received via the PDSCH channel after updating the one or more PDSCH channel parameters.

Any of the UEs above, wherein the one or more PDSCH channel properties include at least one of a delay spread, a Doppler spread, an average delay, or a Doppler shift.

Any of the UEs above, wherein a last-in-time AP-CSI-RS of the plurality of AP-CSI-RSs is received before receiving a first resource of the downlink data.

Any of the UEs above, further comprising means for determining whether a time gap between the last AP-CSI-RS of the plurality of AP-CSI-RSs and the first resource of the downlink data is greater than, equal to, or less than a threshold time gap.

Any of the UEs above, further comprising means for receiving, based on the time gap being greater than or equal to the threshold time gap, the downlink data via a PDSCH channel configured based on at least one of the plurality of AP-CSI-RSs, or means for receiving, based on the time gap being less than the threshold time gap, the downlink data via a PDSCH channel that is not configured based on the plurality of AP-CSI-RS s.

To the accomplishment of the foregoing and related ends, the one or more aspects comprise the features hereinafter fully described and particularly pointed out in the claims. The following description and the annexed drawings set forth in detail some illustrative features of the one or more aspects. These features are indicative, however, of but a few of the various ways in which the principles of various aspects may be employed, and this description is intended to include all such aspects and their equivalents.

DETAILED DESCRIPTION

Figure 1:
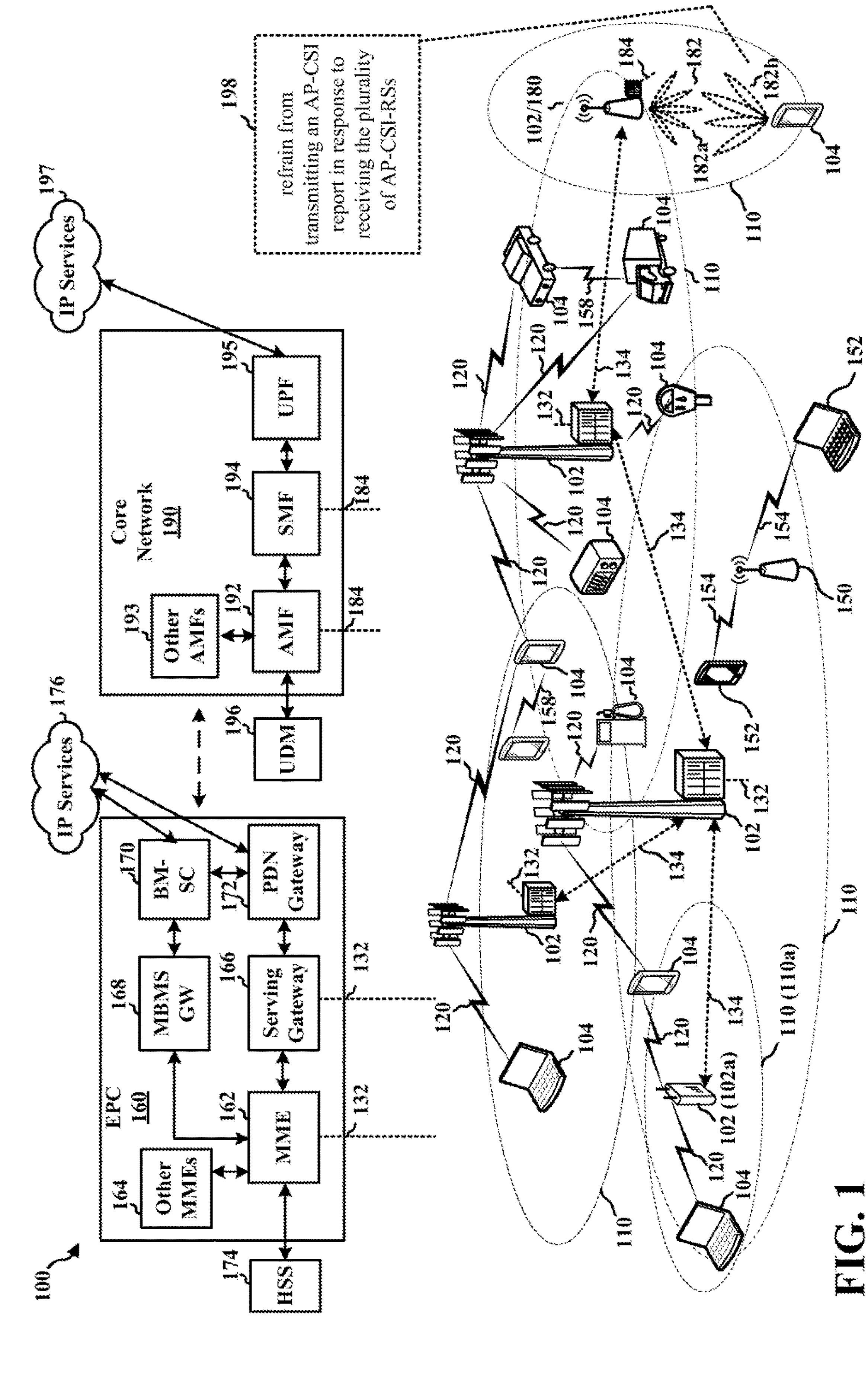
FIG. 1 is a diagram illustrating an example of a wireless communications system and an access network in accordance with some aspects of the present disclosure.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those of ordinary skill in the art that these concepts may be practiced without these specific details. In some instances, structures and components are shown in block diagram form in order to avoid obscuring such concepts.

Various aspects relate generally to refraining from transmitting a report after the reception of aperiodic (AP) reference signals (RSs) by a user equipment (UE). Some aspects more specifically relate to refraining from transmitting a channel state information (CSI) report to a base station (BS) after the reception of AP-CSI-RSs. In some aspects, the BS may transmit downlink control information (DCI) indicating the transmission of the AP-CSI RSs and the transmission of downlink data via a downlink channel, for example, via a physical downlink shared channel (PDSCH). The BS may then transmit the one or more AP-CSI-RSs, followed by the transmission of the downlink data. The UE may receive the one or more AP-CSI-RSs and the downlink data. However, some of the CSI obtained by the UE during the reception of the one or more AP-CSI-RSs may become outdated after the reception of the downlink data. In accordance with the techniques described herein, the UE may refrain from transmitting a CSI report associated with the reception of the one or more AP-CSI-RSs. The UE may, however, transmit an acknowledgement (ACK) or a negative acknowledgement (NACK) associated with the downlink data. In some examples, the UE may perform a UE beam refinement process based on the one or more AP-CSI-RSs. In some other examples, the UE may utilize the one or more AP-CSI-RSs to update one or more downlink channel properties of the downlink channel associated with the reception of the downlink data.

Particular implementations of the subject matter described in this disclosure can be implemented to realize one or more of the following potential advantages. In some implementations, the described techniques can be used to reduce traffic load associated with the transmission of the AP-CSI report. For example, unused resources that would have been allocated for the transmission of the AP-CSI report may be allocated for other uplink and/or downlink transmissions. In an aspect, the described techniques may be used to prevent the transmission of outdated CSI to the BS, which may reduce error in transmission and/or wasted resources for transmitting unnecessary information (e.g., "stale" information) in the network. For example, if the UE transmits outdated CSI of a communication channel to the BS, the channel condition of the communication channel may have degraded below an acceptable level. However, the BS may be unaware of the degradation based on the stale CSI transmitted by the UE, and still transmits information via the communication channel, causing loss of control and/or data information. Further, preventing the transmission of outdated CSI may reduce the network load as the resources allocated for the outdated CSI may be allocated for other transmissions.

Several aspects of telecommunication systems will now be presented with reference to various apparatus and methods. These apparatus and methods will be described in the following detailed description and illustrated in the accompanying drawings by various blocks, components, circuits, processes, algorithms, among other examples (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented as a "processing system" that includes one or more processors. Examples of processors include microprocessors, microcontrollers, graphics processing units (GPUs), central processing units (CPUs), application processors, digital signal processors (DSPs), reduced instruction set computing (RISC) processors, systems on a chip (SoC), baseband processors, field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software components, applications, software applications, software packages, routines, subroutines, objects, executables, threads of execution, procedures, functions, among other examples, whether referred to as software, firmware, middleware, microcode, hardware description language, or otherwise.

Accordingly, in one or more examples, the functions described may be implemented in hardware, software, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can include a random-access memory (RAM), a read-only memory (ROM), an electrically erasable programmable ROM (EEPROM), optical disk storage, magnetic disk storage, other magnetic storage devices, combinations of the aforementioned types of computer-readable media, or any other medium that can be used to store computer executable code in the form of instructions or data structures that can be accessed by a computer.

FIG. 1 is a diagram illustrating an example of a wireless communications system and an access network 100. The wireless communications system (also referred to as a wireless wide area network (WWAN)) includes base stations 102, UEs 104, an Evolved Packet Core (EPC) 160, and another core network 190 (for example, a 5G Core (5GC)). The base stations 102 may include macrocells (high power cellular base station) or small cells (low power cellular base station). The macrocells include base stations. The small cells include femtocells, picocells, and microcells.

The base stations 102 configured for 4G LTE (collectively referred to as Evolved Universal Mobile Telecommunications System (UMTS) Terrestrial Radio Access Network (E-UTRAN)) may interface with the EPC 160 through first backhaul links 132 (for example, an S1 interface). The base stations 102 configured for 5G NR (collectively referred to as Next Generation RAN (NG-RAN)) may interface with core network 190 through second backhaul links 184. In addition to other functions, the base stations 102 may perform one or more of the following functions: transfer of user data, radio channel ciphering and deciphering, integrity protection, header compression, mobility control functions (for example, handover, dual connectivity), inter-cell interference coordination, connection setup and release, load balancing, distribution for non-access stratum (NAS) messages, NAS node selection, synchronization, radio access network (RAN) sharing, multimedia broadcast multicast service (MBMS), subscriber and equipment trace, RAN information management (RIM), paging, positioning, and delivery of warning messages. The base stations 102 may communicate directly or indirectly (for example, through the EPC 160 or core network 190) with each other over third backhaul links 134 (for example, X2 interface). The third backhaul links 134 may be wired or wireless.

The base stations 102 may wirelessly communicate with the UEs 104. Each of the base stations 102 may provide communication coverage for a respective geographic coverage area 110. There may be overlapping geographic coverage areas 110. For example, the small cell **102*a* may have a coverage area 110*a* that overlaps the coverage area 110 of one or more macro base stations 102. A network that includes both small cell and macrocells may be known as a heterogeneous network. A heterogeneous network may also include Home Evolved Node Bs (eNBs) (HeNBs), which may provide service to a restricted group known as a closed subscriber group (CSG). The communication links 120 between the base stations 102 and the UEs 104 may include uplink (UL) (also referred to as reverse link) transmissions from a UE 104 to a base station 102 or downlink (DL) (also referred to as forward link) transmissions from a base station 102 to a UE 104. The communication links 120 may use multiple-input and multiple-output (MIMO) antenna technology, including spatial multiplexing, beamforming, or transmit diversity. The communication links may be through one or more carriers. The base stations 102/UEs 104** may use spectrum up to Y MHz (for example, 5, 10, 15, 20, 100, 400 MHz, among other examples) bandwidth per carrier allocated in a carrier aggregation of up to a total of Yx MHz (x component carriers) used for transmission in each direction. The carriers may or may not be adjacent to each other. Allocation of carriers may be asymmetric with respect to DL and UL (for example, more or fewer carriers may be allocated for DL than for UL). The component carriers may include a primary component carrier and one or more secondary component carriers. A primary component carrier may be referred to as a primary cell (PCell) and a secondary component carrier may be referred to as a secondary cell (SCell).

Some UEs 104 may communicate with each other using device-to-device (D2D) communication link 158. The D2D communication link 158 may use the DL/UL WWAN spectrum. The D2D communication link 158 may use one or more sidelink channels, such as a physical sidelink broadcast channel (PSBCH), a physical sidelink discovery channel (PSDCH), a physical sidelink shared channel (PSSCH), and a physical sidelink control channel (PSCCH). D2D communication may be through a variety of wireless D2D communications systems, such as for example, FlashLinQ, WiMedia, Bluetooth, ZigBee, Wi-Fi based on the IEEE 802.11 standard, LTE, or NR.

The wireless communications system may further include a Wi-Fi access point (AP) 150 in communication with Wi-Fi stations (STAs) 152 via communication links 154 in a 5 GHz unlicensed frequency spectrum. When communicating in an unlicensed frequency spectrum, the STAs 152/AP 150 may perform a clear channel assessment (CCA) prior to communicating in order to determine whether the channel is available.

The small cell **102*a* may operate in a licensed or an unlicensed frequency spectrum. When operating in an unlicensed frequency spectrum, the small cell 102*a* may employ NR and use the same 5 GHz unlicensed frequency spectrum as used by the Wi-Fi AP 150. The small cell 102***a*, employing NR in an unlicensed frequency spectrum, may boost coverage to or increase capacity of the access network.

A base station 102, whether a small cell 102*a* or a large cell (for example, macro base station), may include or be referred to as an eNB, gNodeB (gNB), or another type of base station. Some base stations, such as gNB 180 may operate in a traditional sub 6 GHz spectrum, in millimeter wave (mmW) frequencies, or near mmW frequencies in communication with the UE 104. When the gNB 180 operates in mmW or near mmW frequencies, the gNB 180 may be referred to as an mmW base station. Extremely high frequency (EHF) is part of the RF in the electromagnetic spectrum. EHF has a range of 30 GHz to 300 GHz and a wavelength between 1 millimeter and 10 millimeters. Radio waves in the band may be referred to as a millimeter wave. Near mmW may extend down to a frequency of 3 GHz with a wavelength of 100 millimeters. The super high frequency (SHF) band extends between 3 GHz and 30 GHz, also referred to as centimeter wave. Communications using the mmW/near mmW radio frequency band (for example, 3 GHz-300 GHz) has extremely high path loss and a short range. The mmW base station 180 may utilize beamforming 182 with the UE 104 to compensate for the extremely high path loss and short range. The base station 180 and the UE 104 may each include a plurality of antennas, such as antenna elements, antenna panels, or antenna arrays to facilitate the beamforming.

The base station 180 may transmit a beamformed signal to the UE 104 in one or more transmit directions 182*a*. The UE 104 may receive the beamformed signal from the base station 180 in one or more receive directions 182*b*. The UE 104 may also transmit a beamformed signal to the base station 180 in one or more transmit directions. The base station 180 may receive the beamformed signal from the UE 104 in one or more receive directions. The base station 180/UE 104 may perform beam training to determine the best receive and transmit directions for each of the base station 180/UE 104. The transmit and receive directions for the base station 180 may or may not be the same. The transmit and receive directions for the UE 104 may or may not be the same.

The EPC 160 may include a Mobility Management Entity (MME) 162, other MMEs 164, a Serving Gateway 166, a Multimedia Broadcast Multicast Service (MBMS) Gateway 168, a Broadcast Multicast Service Center (BM-SC) 170, and a Packet Data Network (PDN) Gateway 172. The MME 162 may be in communication with a Home Subscriber Server (HSS) 174. The MME 162 is the control node that processes the signaling between the UEs 104 and the EPC 160. Generally, the MME 162 provides bearer and connection management. All user Internet protocol (IP) packets are transferred through the Serving Gateway 166, which itself is connected to the PDN Gateway 172. The PDN Gateway 172 provides UE IP address allocation as well as other functions. The PDN Gateway 172 and the BM-SC 170 are connected to the IP Services 176. The IP Services 176 may include the Internet, an intranet, an IP Multimedia Subsystem (IMS), a PS Streaming Service, or other IP services. The BM-SC 170 may provide functions for MBMS user service provisioning and delivery. The BM-SC 170 may serve as an entry point for content provider MBMS transmission, may be used to authorize and initiate MBMS Bearer Services within a public land mobile network (PLMN), and may be used to schedule MBMS transmissions. The MBMS Gateway 168 may be used to distribute MBMS traffic to the base stations 102 belonging to a Multicast Broadcast Single Frequency Network (MBSFN) area broadcasting a particular service, and may be responsible for session management (start/stop) and for collecting eMBMS related charging information.

The core network 190 may include a Access and Mobility Management Function (AMF) 192, other AMFs 193, a Session Management Function (SMF) 194, and a User Plane Function (UPF) 195. The AMF 192 may be in communication with a Unified Data Management (UDM) 196. The AMF 192 is the control node that processes the signaling between the UEs 104 and the core network 190. Generally, the AMF 192 provides QoS flow and session management. All user Internet protocol (IP) packets are transferred through the UPF 195. The UPF 195 provides UE IP address allocation as well as other functions. The UPF 195 is connected to the IP Services 197. The IP Services 197 may include the Internet, an intranet, an IP Multimedia Subsystem (IMS), a PS Streaming Service, or other IP services.

The base station may include or be referred to as a gNB, Node B, eNB, an access point, a base transceiver station, a radio base station, a radio transceiver, a transceiver function, a basic service set (BSS), an extended service set (ESS), a transmit reception point (TRP), or some other suitable terminology. The base station 102 provides an access point to the EPC 160 or core network 190 for a UE 104. Examples of UEs 104 include a cellular phone, a smart phone, a session initiation protocol (SIP) phone, a laptop, a personal digital assistant (PDA), a satellite radio, a global positioning system, a multimedia device, a video device, a digital audio player (for example, MP3 player), a camera, a game console, a tablet, a smart device, a wearable device, a vehicle, an electric meter, a gas pump, a large or small kitchen appliance, a healthcare device, an implant, a sensor/actuator, a display, or any other similar functioning device. Some of the UEs 104 may be referred to as IoT devices (for example, parking meter, gas pump, toaster, vehicles, heart monitor, among other examples). The UE 104 may also be referred to as a station, a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

Referring again to FIG. 1, in some aspects, the UE 104 may be configured to refrain from transmitting an AP-CSI report in response to receiving the plurality of AP-CSI-RSs (198). In some aspects, the UE 104 may be configured to refrain from transmitting outdated channel state information based on the reception of the plurality of AP-CSI-RSs to reduce uplink network congestion. Although the following description may be focused on 5G NR, the concepts described herein may be applicable to other similar areas, such as LTE, LTE-A, CDMA, GSM, and other wireless technologies.

Figures 2A, 2B, 2C, 2D:
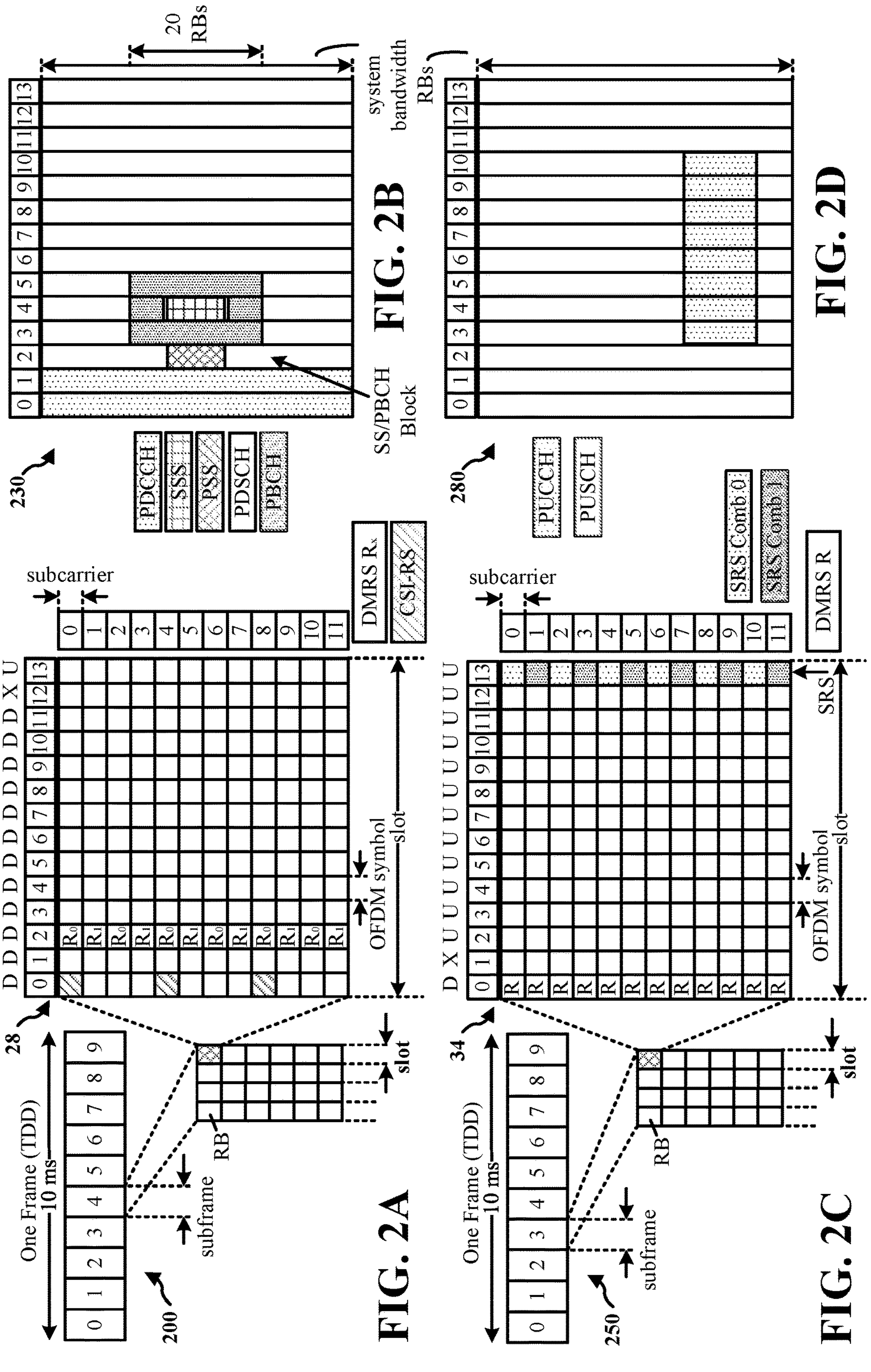
FIGS. 2A, 2B, 2C, and 2D are diagrams illustrating examples of a first 5G/NR frame, DL channels within a 5G/NR subframe, a second 5G/NR frame, and UL channels within a 5G/NR subframe, respectively, in accordance with some aspects of the present disclosure.

FIG. 2A is a diagram 200 illustrating an example of a first subframe within a 5G/NR frame structure. FIG. 2B is a diagram 230 illustrating an example of DL channels within a 5G/NR subframe. FIG. 2C is a diagram 250 illustrating an example of a second subframe within a 5G/NR frame structure. FIG. 2D is a diagram 280 illustrating an example of UL channels within a 5G/NR subframe. The 5G/NR frame structure may be FDD in which for a particular set of subcarriers (carrier system bandwidth), subframes within the set of subcarriers are dedicated for either DL or UL, or may be TDD in which for a particular set of subcarriers (carrier system bandwidth), subframes within the set of subcarriers are dedicated for both DL and UL. In the examples provided by FIGS. 2A, 2C, the 5G/NR frame structure is assumed to be TDD, with subframe 4 being configured with slot format 28 (with mostly DL), where D is DL, U is UL, and X is flexible for use between DL/UL, and subframe 3 being configured with slot format 34 (with mostly UL). While subframes 3, 4 are shown with slot formats 34, 28, respectively, any particular subframe may be configured with any of the various available slot formats 0-61. Slot formats 0, 1 are all DL, UL, respectively. Other slot formats 2-61 include a mix of DL, UL, and flexible symbols. UEs are configured with the slot format (dynamically through DL control information (DCI), or semi-statically/statically through radio resource control (RRC) signaling) through a received slot format indicator (SFI). Note that the description presented herein applies also to a 5G/NR frame structure that is TDD.

Other wireless communication technologies may have a different frame structure or different channels. A frame (10 ms) may be divided into 10 equally sized subframes (1 ms). Each subframe may include one or more time slots. Subframes may also include mini-slots, which may include 7, 4, or 2 symbols. Each slot may include 7 or 14 symbols, depending on the slot configuration. For slot configuration 0, each slot may include 14 symbols, and for slot configuration 1, each slot may include 7 symbols. The symbols on DL may be cyclic prefix (CP) OFDM (CP-OFDM) symbols. The symbols on UL may be CP-OFDM symbols (for high throughput scenarios) or discrete Fourier transform (DFT) spread OFDM (DFT-s-OFDM) symbols (also referred to as single carrier frequency-division multiple access (SC-FDMA) symbols) (for power limited scenarios; limited to a single stream transmission). The number of slots within a subframe is based on the slot configuration and the numerology. For slot configuration 0, different numerologies μ 0 to 5 allow for 1, 2, 4, 8, 16, and 32 slots, respectively, per subframe. For slot configuration 1, different numerologies 0 to 2 allow for 2, 4, and 8 slots, respectively, per subframe. Accordingly, for slot configuration 0 and numerology μ, there are 14 symbols/slot and $2^{\mu}$ slots/subframe. The subcarrier spacing and symbol length/duration are a function of the numerology. The subcarrier spacing may be equal to $2^{\mu}*15$ kHz, where μ is the numerology 0 to 5. As such, the numerology μ=0 has a subcarrier spacing of 15 kHz and the numerology μ=5 has a subcarrier spacing of 480 kHz. The symbol length/duration is inversely related to the subcarrier spacing. FIGS. 2A-2D provide an example of slot configuration 0 with 14 symbols per slot and numerology μ=0 with 1 slot per subframe. The subcarrier spacing is 15 kHz and symbol duration is approximately 66.7 μs.

A resource grid may be used to represent the frame structure. Each time slot includes a resource block (RB) (also referred to as physical RBs (PRBs)) that extends 12 consecutive subcarriers. The resource grid is divided into multiple resource elements (REs). The number of bits carried by each RE depends on the modulation scheme.

As illustrated in FIG. 2A, some of the REs carry reference (pilot) signals (RS) for the UE. The RS may include demodulation RS (DM-RS) (indicated as $R_x$ for one particular configuration, where 100x is the port number, but other DM-RS configurations are possible) and channel state information reference signals (CSI-RS) for channel estimation at the UE. The RS may also include beam measurement RS (BRS), beam refinement RS (BRRS), and phase tracking RS (PT-RS).

FIG. 2B illustrates an example of various DL channels within a subframe of a frame. The physical downlink control channel (PDCCH) carries DCI within one or more control channel elements (CCEs), each CCE including nine RE groups (REGs), each REG including four consecutive REs in an OFDM symbol. A primary synchronization signal (PSS) may be within symbol 2 of particular subframes of a frame. The PSS is used by a UE 104 to determine subframe/symbol timing and a physical layer identity. A secondary synchronization signal (SSS) may be within symbol 4 of particular subframes of a frame. The SSS is used by a UE to determine a physical layer cell identity group number and radio frame timing. Based on the physical layer identity and the physical layer cell identity group number, the UE can determine a physical cell identifier (PCI). Based on the PCI, the UE can determine the locations of the aforementioned DM-RS. The physical broadcast channel (PBCH), which carries a master information block (MIB), may be logically grouped with the PSS and SSS to form a synchronization signal (SS)/PBCH block. The MIB provides a number of RBs in the system bandwidth and a system frame number (SFN). The physical downlink shared channel (PDSCH) carries user data, broadcast system information not transmitted through the PBCH such as system information blocks (SIBs), and paging messages.

As illustrated in FIG. 2C, some of the REs carry DM-RS (indicated as R for one particular configuration, but other DM-RS configurations are possible) for channel estimation at the base station. The UE may transmit DM-RS for the physical uplink control channel (PUCCH) and DM-RS for the physical uplink shared channel (PUSCH). The PUSCH DM-RS may be transmitted in the first one or two symbols of the PUSCH. The PUCCH DM-RS may be transmitted in different configurations depending on whether short or long PUCCHs are transmitted and depending on the particular PUCCH format used. Although not shown, the UE may transmit sounding reference signals (SRS). The SRS may be used by a base station for channel quality estimation to enable frequency-dependent scheduling on the UL.

FIG. 2D illustrates an example of various UL channels within a subframe of a frame. The PUCCH may be located as indicated in one configuration. The PUCCH carries uplink control information (UCI), such as scheduling requests, a channel quality indicator (CQI), a precoding matrix indicator (PMI), a rank indicator (RI), and HARQ ACK/NACK feedback. The PUSCH carries data, and may additionally be used to carry a buffer status report (BSR), a power headroom report (PHR), or UCI.

Figure 3:
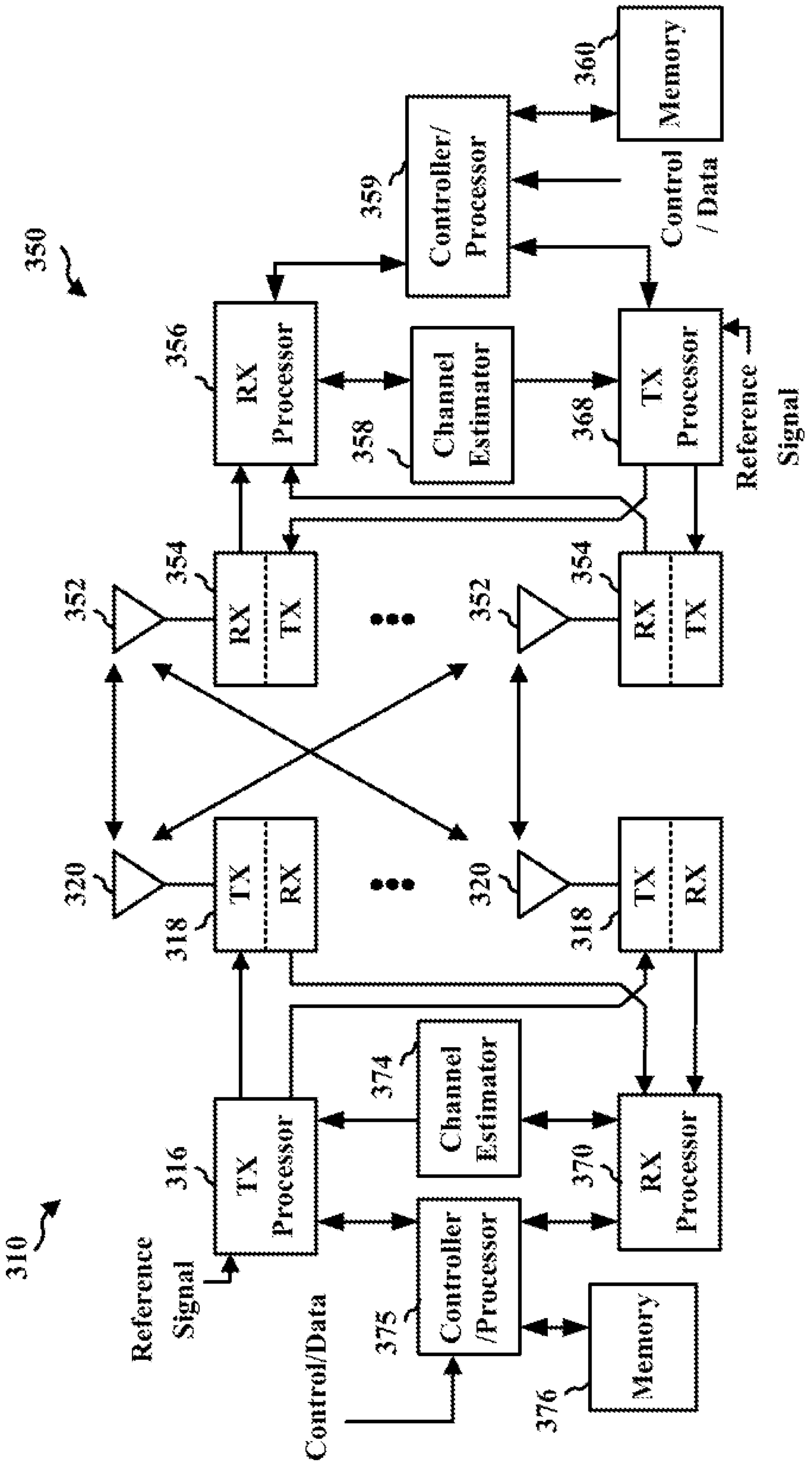
FIG. 3 is a diagram illustrating an example of a base station and user equipment (UE) in an access network in accordance with some aspects of the present disclosure.

FIG. 3 is a block diagram of a base station 310 in communication with a UE 350 in an access network. In the DL, IP packets from the EPC 160 may be provided to a controller/processor 375. The controller/processor 375 implements layer 3 and layer 2 functionality. Layer 3 includes a radio resource control (RRC) layer, and layer 2 includes a service data adaptation protocol (SDAP) layer, a packet data convergence protocol (PDCP) layer, a radio link control (RLC) layer, and a medium access control (MAC) layer. The controller/processor 375 provides RRC layer functionality associated with broadcasting of system information (such as MIB, SIBs), RRC connection control (such as RRC connection paging, RRC connection establishment, RRC connection modification, and RRC connection release), inter radio access technology (RAT) mobility, and measurement configuration for UE measurement reporting; PDCP layer functionality associated with header compression/decompression, security (ciphering, deciphering, integrity protection, integrity verification), and handover support functions; RLC layer functionality associated with the transfer of upper layer packet data units (PDUs), error correction through ARQ, concatenation, segmentation, and reassembly of RLC service data units (SDUs), re-segmentation of RLC data PDUs, and reordering of RLC data PDUs; and MAC layer functionality associated with mapping between logical channels and transport channels, multiplexing of MAC SDUs onto transport blocks (TBs), demultiplexing of MAC SDUs from TBs, scheduling information reporting, error correction through HARQ, priority handling, and logical channel prioritization.

The transmit (TX) processor 316 and the receive (RX) processor 370 implement layer 1 functionality associated with various signal processing functions. Layer 1, which includes a physical (PHY) layer, may include error detection on the transport channels, forward error correction (FEC) coding/decoding of the transport channels, interleaving, rate matching, mapping onto physical channels, modulation/demodulation of physical channels, and MIMO antenna processing. The TX processor 316 handles mapping to signal constellations based on various modulation schemes (such as binary phase-shift keying (BPSK), quadrature phase-shift keying (QPSK), M-phase-shift keying (M-PSK), M-quadrature amplitude modulation (M-QAM)). The coded and modulated symbols may then be split into parallel streams. Each stream may then be mapped to an OFDM subcarrier, multiplexed with a reference signal (such as a pilot) in the time or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 374 may be used to determine the coding and modulation scheme, as well as for spatial processing. The channel estimate may be derived from a reference signal or channel condition feedback transmitted by the UE 350. Each spatial stream may then be provided to a different antenna 320 via a separate transmitter 318TX. Each transmitter 318TX may modulate an RF carrier with a respective spatial stream for transmission.

At the UE 350, each receiver 354RX receives a signal through its respective antenna 352. Each receiver 354RX recovers information modulated onto an RF carrier and provides the information to the receive (RX) processor 356. The TX processor 368 and the RX processor 356 implement layer 1 functionality associated with various signal processing functions. The RX processor 356 may perform spatial processing on the information to recover any spatial streams destined for the UE 350. If multiple spatial streams are destined for the UE 350, they may be combined by the RX processor 356 into a single OFDM symbol stream. The RX processor 356 then converts the OFDM symbol stream from the time-domain to the frequency domain using a Fast Fourier Transform (FFT). The frequency domain signal includes a separate OFDM symbol stream for each subcarrier of the OFDM signal. The symbols on each subcarrier, and the reference signal, are recovered and demodulated by determining the most likely signal constellation points transmitted by the base station 310. These soft decisions may be based on channel estimates computed by the channel estimator 358. The soft decisions are then decoded and deinterleaved to recover the data and control signals that were originally transmitted by the base station 310 on the physical channel. The data and control signals are then provided to the controller/processor 359, which implements layer 3 and layer 2 functionality.

The controller/processor 359 can be associated with a memory 360 that stores program codes and data. The memory 360 may be referred to as a computer-readable medium. In the UL, the controller/processor 359 provides demultiplexing between transport and logical channels, packet reassembly, deciphering, header decompression, and control signal processing to recover IP packets from the EPC 160. The controller/processor 359 is also responsible for error detection using an ACK or NACK protocol to support HARQ operations.

Similar to the functionality described in connection with the DL transmission by the base station 310, the controller/processor 359 provides RRC layer functionality associated with system information (for example, MIB, SIBs) acquisition, RRC connections, and measurement reporting; PDCP layer functionality associated with header compression/decompression, and security (ciphering, deciphering, integrity protection, integrity verification); RLC layer functionality associated with the transfer of upper layer PDUs, error correction through ARQ, concatenation, segmentation, and reassembly of RLC SDUs, re-segmentation of RLC data PDUs, and reordering of RLC data PDUs; and MAC layer functionality associated with mapping between logical channels and transport channels, multiplexing of MAC SDUs onto TBs, demultiplexing of MAC SDUs from TBs, scheduling information reporting, error correction through HARQ, priority handling, and logical channel prioritization.

Channel estimates derived by a channel estimator 358 from a reference signal or feedback transmitted by the base station 310 may be used by the TX processor 368 to select the appropriate coding and modulation schemes, and to facilitate spatial processing. The spatial streams generated by the TX processor 368 may be provided to different antenna 352 via separate transmitters 354TX. Each transmitter 354TX may modulate an RF carrier with a respective spatial stream for transmission.

The UL transmission is processed at the base station 310 in a manner similar to that described in connection with the receiver function at the UE 350. Each receiver 318RX receives a signal through its respective antenna 320. Each receiver 318RX recovers information modulated onto an RF carrier and provides the information to a RX processor 370.

The controller/processor 375 can be associated with a memory 376 that stores program codes and data. The memory 376 may be referred to as a computer-readable medium. In the UL, the controller/processor 375 provides demultiplexing between transport and logical channels, packet reassembly, deciphering, header decompression, control signal processing to recover IP packets from the UE 350. IP packets from the controller/processor 375 may be provided to the EPC 160. The controller/processor 375 is also responsible for error detection using an ACK or NACK protocol to support HARQ operations.

At least one of the TX processor 368, the RX processor 356, and the controller/processor 359 may be configured to perform aspects in connection with 198 of FIG. 1.

In some aspects of the present disclosure, the DCI scheduling physical downlink shared channel data may trigger the transmission of one or more AP-CSI-RSs, or the transmission of downlink data, without the UE transmitting an aperiodic CSI report. In an implementation, one or more triggered AP-CSI-RS resource sets may include a radio resource control (RRC) parameter (such as the "Repetition" parameter) set as "on." As such, the AP-CSI-RS resources in the set may be used to refine UE receive beams, which may be used for the subsequent reception of downlink data.

In some implementations, one or more triggered AP-CSI-RS resource set may include the RRC parameter (such as the "TRS-info" parameter) configured. A such, the AP-CSI-RS resources in the set may be used to refresh one or more channel estimates, such as delay spread and Doppler shift, which may be used for the subsequent reception of downlink data.

In some aspects, a threshold time gap between the reception of the one or more AP-CSI-RSs and the reception of the downlink data (such as a threshold time gap between the last AP-CSI-RS and the first symbol of the downlink data) may be defined. The threshold time gap may be hard coded into the UE, relayed to the UE by the BS, or determined by the UE based on UE capabilities. The threshold time gap may be a some number of symbols.

In some implementations, if the time gap between the last AP-CSI-RS and the first symbol of the downlink data is greater than or equal to the threshold time gap, the UE may perform one or more of the beam refinement process based on the one or more AP-CSI-RSs or the channel estimate refreshment process. The UE may receive the downlink data based on the beam refinement process or the channel estimation process.

In other implementations, if the time gap between the last AP-CSI-RS and the first symbol of the downlink data is less than the threshold time gap, the UE may not perform one or more of the beam refinement process based on the one or more AP-CSI-RSs or the channel estimate refreshment process.

Figure 4:
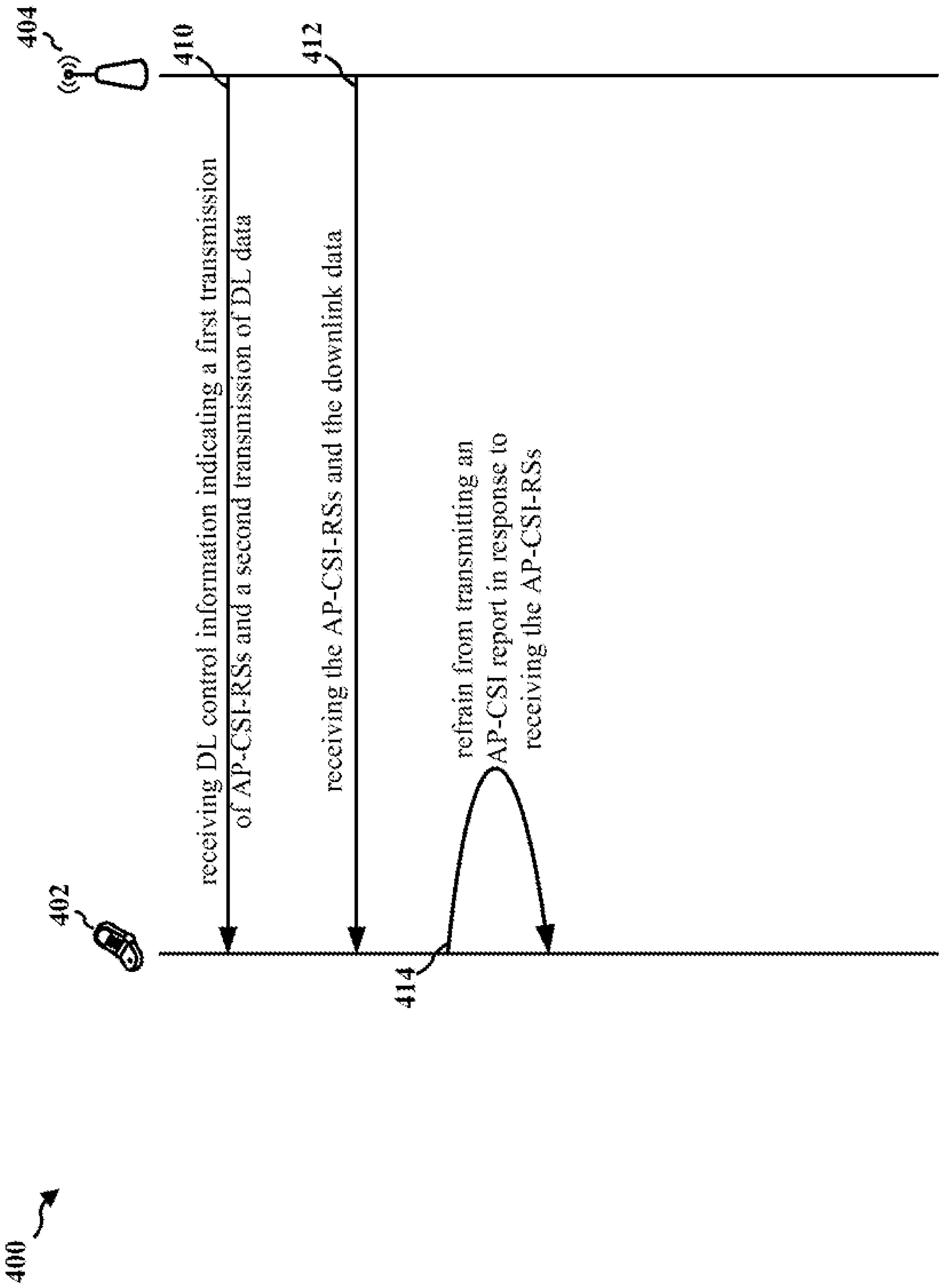
FIG. 4 is an example of a flow chart illustrating a user equipment (UE) refraining from transmitting an aperiodic (AP) channel state information (CSI) report in response to receiving AP-CSI reference signals (AP-CSI-RSs) in accordance with some aspects of the present disclosure.

FIG. 4 is an example of a flow chart 400 illustrating the UE refraining from transmitting an AP-CSI report in response to receiving AP-CSI-RSs. In some implementations, the BS 404, such as the BS 102 or the BS 310, may transmit DCI, such as a DCI indictor or a RRC parameter, indicating a first transmission of one or more AP-CSI-RSs and a second transmission of downlink data. The DCI may indicate downlink resource sets for the one or more AP-CSI-RSs and the downlink data. The BS 404 may schedule the first transmission and the second transmission such that the UE 402 is scheduled to receive the one or more AP-CSI-RSs before the downlink data.

In some examples, at 410, the UE 402 may receive the DCI indicating the first transmission of one or more AP-CSI-RSs and the second transmission of downlink data.

In some aspects of the present disclosure, the BS 404 may transmit the one or more AP-CSI-RSs and the downlink data. The BS 404 may transmit the one or more AP-CSI-RSs before the downlink data. The BS 404 may transmit the one or more AP-CSI-RSs via one or more downlink channels. Some of the downlink channels may be quasi-co-located with one or more other downlink channels. The BS 404 may transmit the one or more AP-CSI-RSs in one or more symbols. The one or more symbols may be consecutive symbols or non-consecutive symbols. The one or more symbols may differ in time.

In some aspects, at 412, the UE 402 may receive the one or more AP-CSI-RSs and the downlink data. The UE 402 may receive the one or more AP-CSI-RSs before receiving the downlink data. The UE 402 may receive the one or more AP-CSI-RSs via one or more downlink channels, or one or more symbols. The reception of the one or more AP-CSI-RSs may indicate to the UE 402 to transmit an AP-CSI report to the BS 404.

In an implementation, at 414, the UE 402 may refrain from transmitting the AP-CSI report in response to receiving the one or more AP-CSI-RSs. The channel state information gathered by the UE 402 via the one or more AP-CSI-RSs may be outdated after the reception of the last AP-CSI-RS of the one or more AP-CSI-RSs, or after the reception of the downlink data. As a result, the UE 402 may determine to disregard the indication to transmit the AP-CSI report to the BS 404. For example, a first AP-CSI-RS received by the UE 402 in a first symbol (earliest symbol in time) may provide an indication of the channel state of a channel. When the UE 402 receives a last AP-CSI-RS in a last symbol (latest symbol in time), the channel state of the channel indicated via the first AP-CSI-RS may have changed. The change in the channel state may be due to interference.

Figure 5:
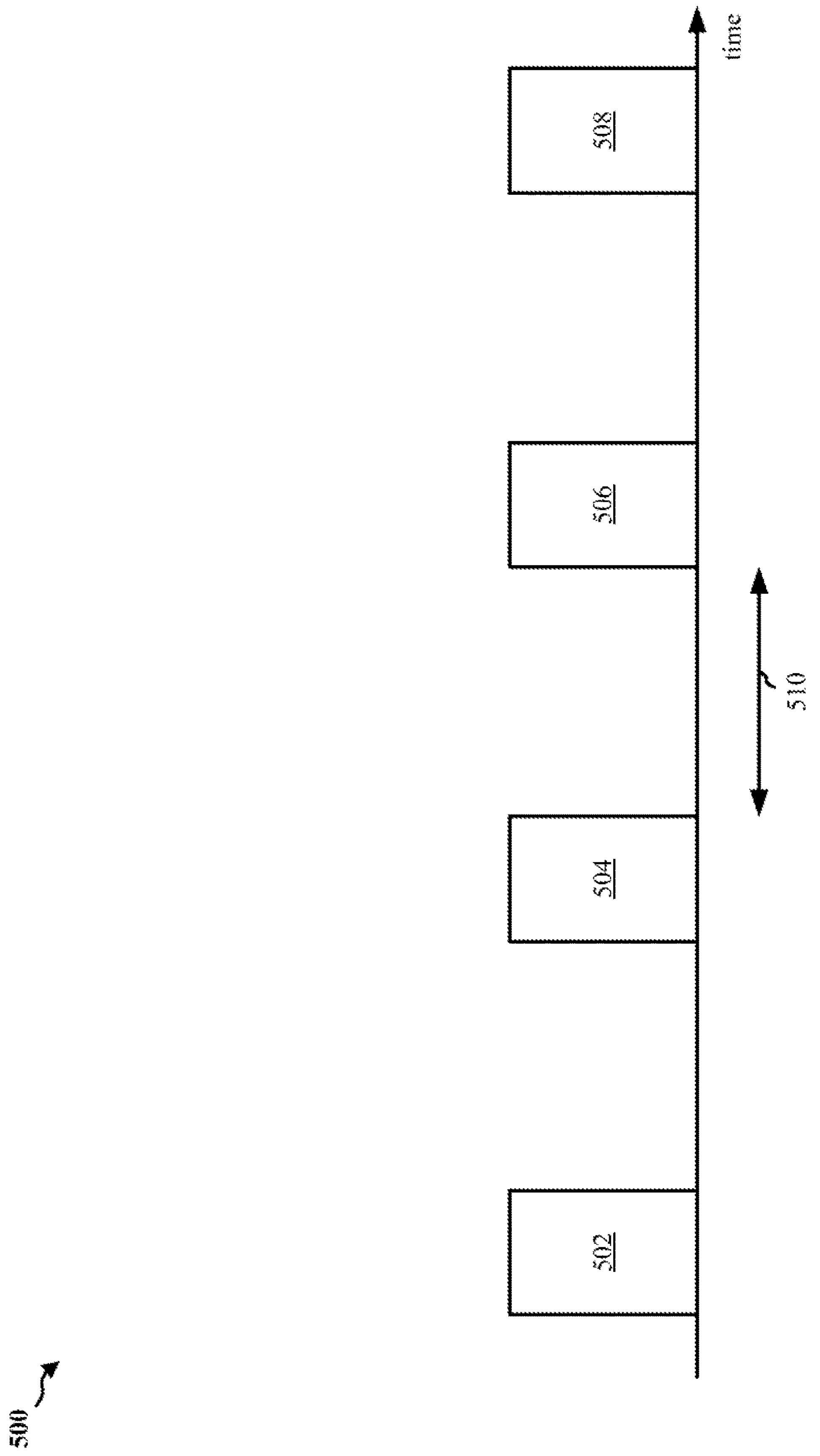
FIG. 5 is an example of a timing diagram for refraining from transmitting an AP-CSI report in accordance with some aspects of the present disclosure.

FIG. 5 is an example of a timing diagram 500 for refraining from transmitting an AP-CSI report. In some aspects of the present disclosure, the BS, such as the BS 102, 310, or 404, may schedule the DCI 502 in the downlink control resources. The DCI 502 may include a DCI indicator or a RRC parameter. The BS may transmit the DCI 502 to the UE, such as the UE 104, 350, or 402. The UE may receive the DCI 502 from the BS. The DCI 502 may indicate the resources or resources sets associated with the one or more AP-CSI-RSs 504 or the downlink data 506. Specifically, the DCI 502 may indicate the symbols, subcarriers, or channels for transmitting the one or more AP-CSI-RSs 504. Some of the channels may be quasi-co-located. The DCI 502 may indicate the symbols, subcarriers, or channels for transmitting the downlink data 506. The BS may transmit the DCI 502 via a physical downlink control channel (PDCCH).

In an aspect of the present disclosure, after receiving the DCI 502, the BS may transmit the one or more AP-CSI-RSs 504 to the UE. The UE may receive the one or more AP-CSI-RSs 504 from the BS. The one or more AP-CSI-RSs 504 may be received via one or more symbols, subcarriers, or channels. In one aspect of the present disclosure, the UE may receive the one or more AP-CSI-RSs 504 across more than one symbol. The UE may receive the one or more AP-CSI-RSs 504 via more than one channel, including the data channel for receiving the downlink data 506.

In some aspects of the present disclosure, the UE may perform the beam refinement process based on at least some of the one or more AP-CSI-RSs 504. For example, the UE may refine the receiver beam associated with receiving the downlink data 506. The UE may determine an antenna array among the available antenna arrays (or a combination of antennas or antenna panels). The UE may determine the antenna array with the highest performance parameter, such as the signal-to-noise ratio or carrier-to-noise ratio.

In an aspect of the present disclosure, the UE may perform the channel estimation process based on at least some of the one or more AP-CSI-RSs 504. For example, the UE may receive at least some of the one or more AP-CSI-RSs 504 in a QCL channel that is quasi-co-located with the downlink channel allocated to the UE for receiving the downlink data. The UE may update some of the channel parameters associated with some of the channel properties of the QCL channel based on the one or more AP-CSI-RSs 504. In some aspects, the channel properties may include a delay spread, a Doppler spread, an average delay, or a Doppler shift. The UE may update the corresponding channel parameters of the downlink channel based on the update of the channel parameters of the QCL channel.

In some aspects, the BS may transmit the downlink data 506 to the UE. The BS may transmit the downlink data 506 in a physical data shared channel (PDSCH). The UE may receive the downlink data 506 at a time gap 510 after receiving the one or more AP-CSI-RSs 504. For example, the UE may receive the first symbol (earliest symbol in time) of the downlink data 506 at the time gap 510 after the last AP-CSI-RS of the one or more AP-CSI-RSs 504.

In an aspect of the present disclosure, the time gap 510 may be greater than or equal to a threshold time gap, or smaller than the threshold time gap. If the time gap 510 is greater than or equal to the threshold time gap, the UE may perform at least one of the beam refinement process or the channel estimation process. The UE may receive the downlink data 506 via a beam refined by the beam refinement process based on the one or more AP-CSI-RSs 504. Alternatively or additionally, the UE may receive the downlink data 506 via the downlink channel after the channel parameters of the downlink channel have been updated in response to the UE receiving the one or more AP-CSI-RSs 504.

In a different aspect, if the time gap 510 is less than the threshold time gap, the UE may receive the downlink data 506 via a beam that has not been refined by the beam refinement process based on the one or more AP-CSI-RSs 504. Alternatively or additionally, the UE may receive the downlink data 506 via the downlink channel having channel parameters that have not been updated in response to the UE receiving at least a portion of the one or more AP-CSI-RSs 504.

In some implementations, the UE may transmit the uplink control data 508 via resources allocated by the BS. The UE may transmit the uplink control data 508 via a physical uplink control channel (PUCCH). The uplink control data 508 may include ACK or NACK associated with the downlink data 506. The UE may refrain from transmitting an AP-CSI report associated with the one or more AP-CSI-RSs 504.

Figure 6:
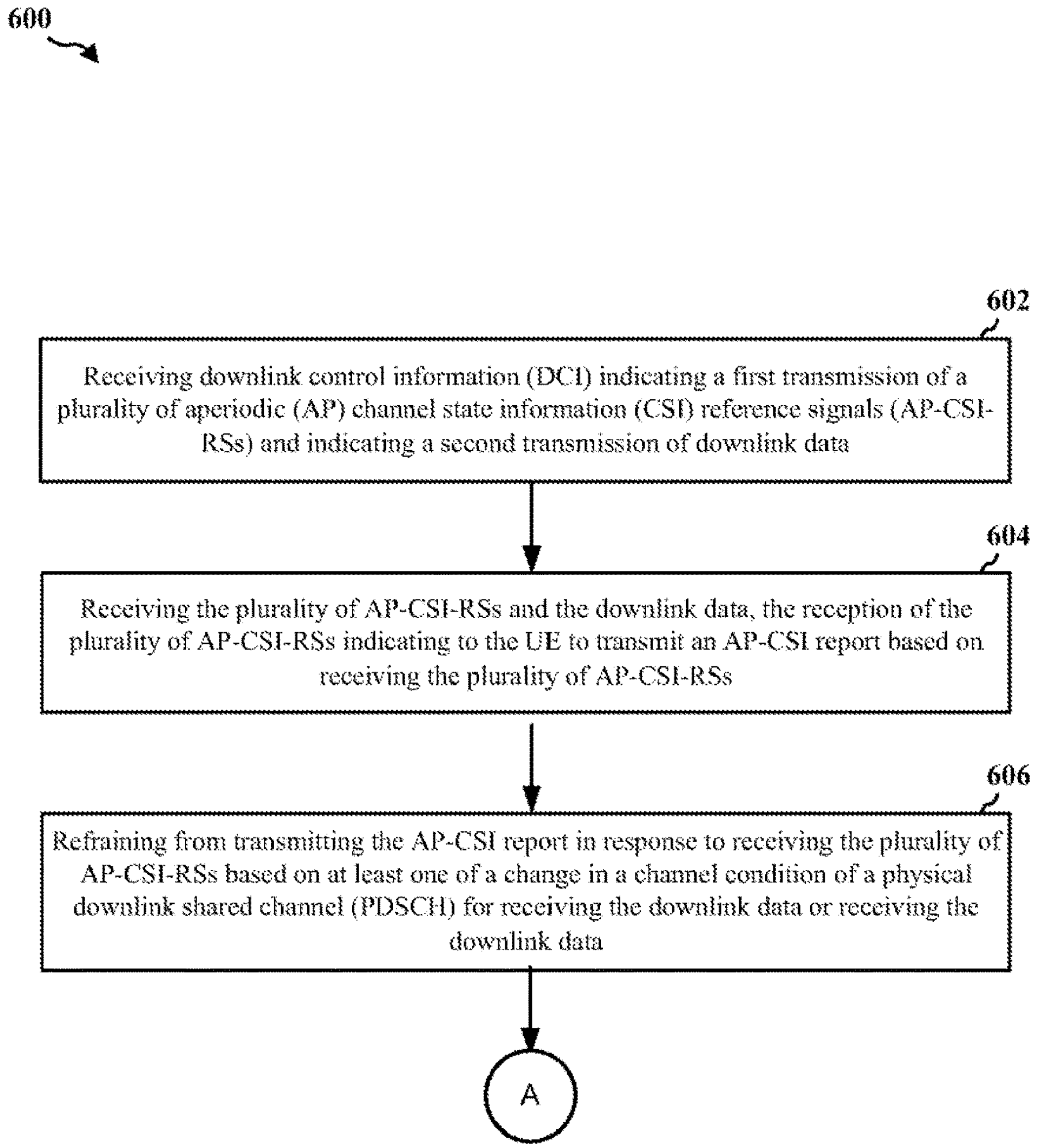
FIG. 6 is a flowchart illustrating a method of wireless communication that supports refraining from transmitting an AP-CSI report in accordance with some aspects of the present disclosure.

FIG. 6 is a flowchart 600 of a method of wireless communication that supports refraining from transmitting an AP-CSI report. The method may be performed by a UE (such as the UE 104, 350, or 402; the apparatus 802; the processing system 914, which may include the memory 360 and which may be the entire UE 104, 350, or 402 or a component of the UE 104, 350, or 402, such as the TX processor 368, the RX processor 356, or the controller/processor 359).

At 602, the UE may receive DCI indicating a first transmission of a plurality of AP-CSI-RSs and indicating a second transmission of downlink data. For example, 602 may be performed by the reception component 804. At 604, the UE may receive the plurality of AP-CSI-RSs and the downlink data, the reception of the plurality of AP-CSI-RSs indicating to the UE to transmit an AP-CSI report based on receiving the plurality of AP-CSI-RSs. For example, 604 may be performed by the reception component 804. Finally, at 606, the UE may refrain from transmitting an AP-CSI report in response to receiving the plurality of AP-CSI-RSs based on at least one of a change in a channel condition of a PDSCH for receiving the downlink data or receiving the downlink data. For example, 606 may be performed by the transmission component 812.

Figure 7:
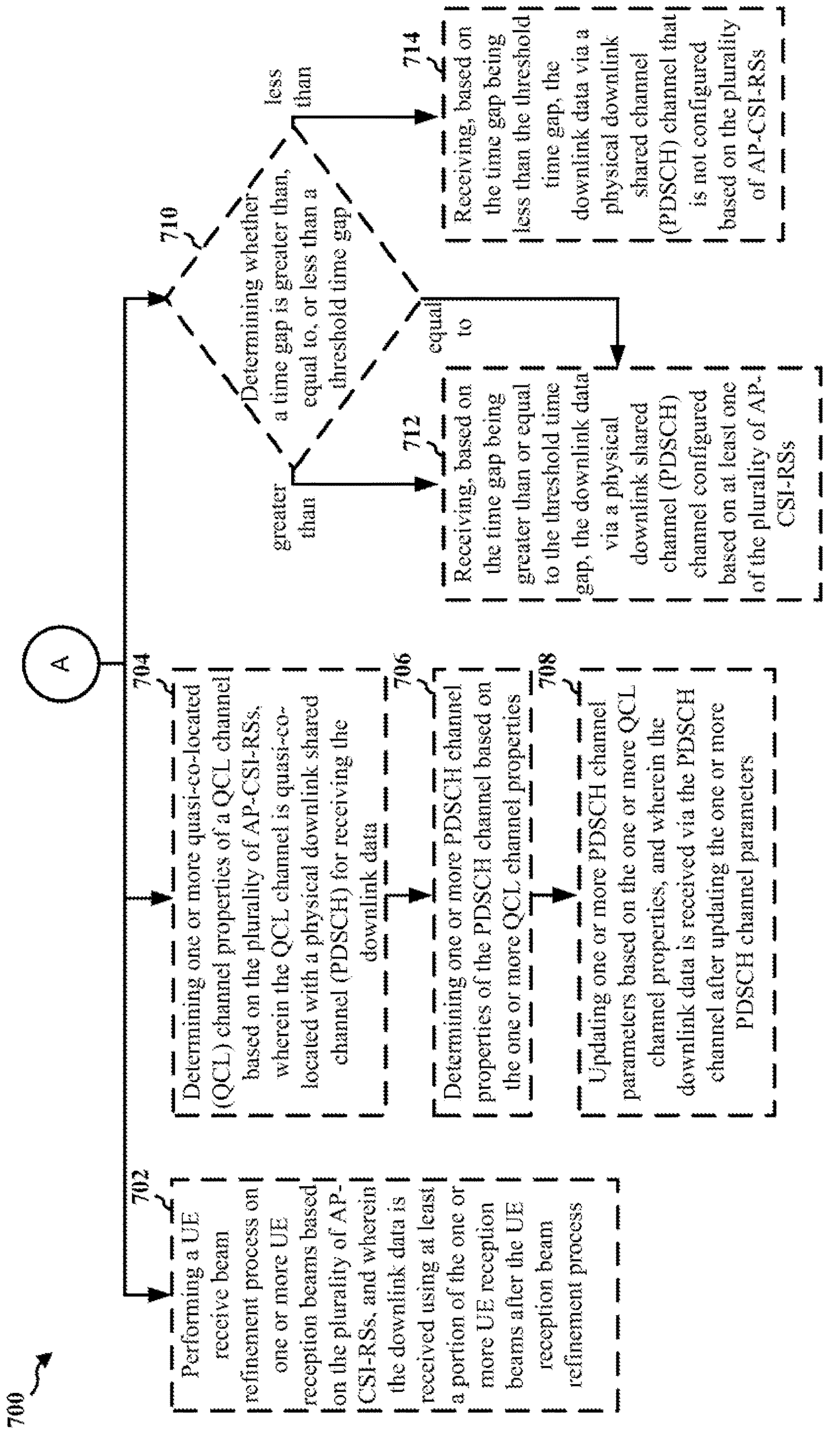
FIG. 7 is a flowchart illustrating optional features of wireless communication that support refraining from transmitting an AP-CSI report in accordance with some aspects of the present disclosure.

FIG. 7 is a flowchart 700 of optional features of wireless communication support refraining from transmitting an AP-CSI report. The optional method may be performed by a UE (such as the UE 104, 350, or 402; the apparatus 802; the processing system 914, which may include the memory 360 and which may be the entire UE 104, 350, or 402 or a component of the UE 104, 350, or 402, such as the TX processor 368, the RX processor 356, or the controller/processor 359).

At 702, the UE may optionally perform a UE receive beam refinement process on one or more UE reception beams based on the plurality of AP-CSI-RSs, wherein the downlink data is received using at least a portion of the one or more UE reception beams after the UE reception beam refinement process. For example, 702 may be performed by the refinement component 808.

In some implementations, at 704, the UE may optionally perform a PDSCH parameter update process. The UE may determine one or more QCL channel properties of a QCL channel based on the plurality of AP-CSI-RSs, wherein the QCL channel is quasi-co-located with a physical downlink shared channel (PDSCH) for receiving the downlink data. In one instance, the UE may determine the preferred precoding for the PDSCH based on the plurality of AP-CSI-RSs. For example, 704 may be performed by the channel component 810. At 706, the UE may optionally determine one or more PDSCH channel properties of the PDSCH channel based on the one or more QCL channel properties. For example, 706 may be performed by the channel component 810. At 708, the UE may optionally update one or more PDSCH channel parameters based on determining the one or more PDSCH channel properties, wherein the downlink data is received via the PDSCH channel after updating the one or more PDSCH channel parameters. For example, 708 may be performed by the channel component 810.

In some implementations, at 710, the UE may optionally determine whether a time gap is greater than, equal to, or less than a threshold time gap. For example, 710 may be performed by the determination component 806. At 712, the UE may optionally receive, based on the time gap being greater than or equal to the threshold time gap, the downlink data via a PDSCH channel configured based on at least one of the plurality of AP-CSI-RSs. Alternatively, at 714, the UE may optionally receive, based on the time gap being less than the threshold time gap, the downlink data via a PDSCH channel that is not configured based on the plurality of AP-CSI-RSs. For example, 712 and 714 may be performed by the reception component 804.

Figure 8:
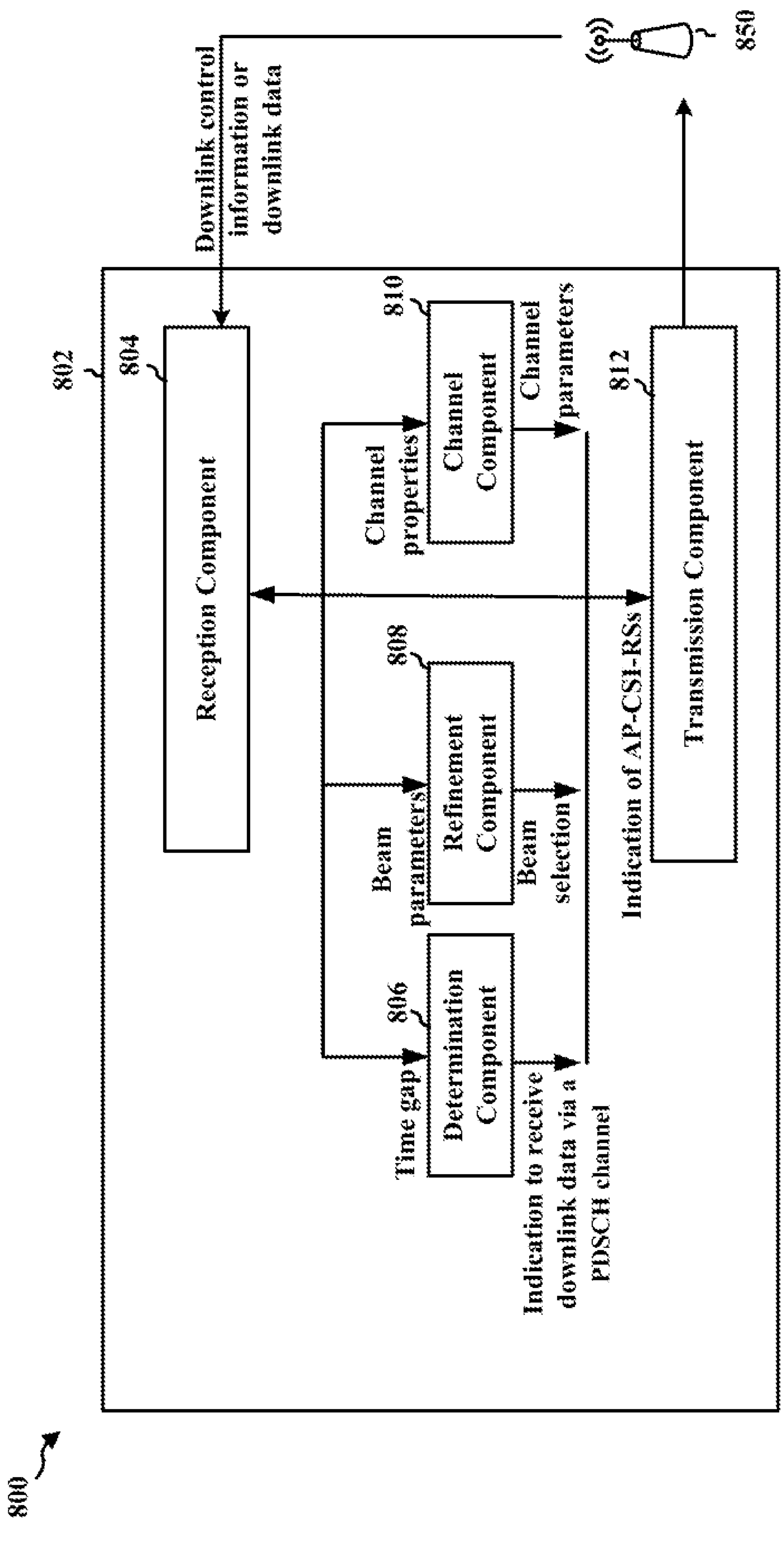
FIG. 8 is a conceptual data flow diagram illustrating the data flow between different components in an example apparatus in accordance with some aspects of the present disclosure.

FIG. 8 is a conceptual data flow diagram 800 illustrating the data flow between different means/components in an example apparatus 802. The apparatus 802 may be a UE, such as the UE 104, 350, or 402. The apparatus 802 includes a reception component 804 that receives DCI or downlink data, such as described in connection with 802 or 804. The apparatus 802 includes a determination component 806 that determines whether a time gap is greater than, equal to, or less than a threshold time gap, such as described in connection with 710. The apparatus 802 includes a refinement component 808 that performs a beam refinement process, such as described in connection with 702. The apparatus 802 includes a channel component 810 that updates the channel parameters, such as described in connection with 704, 706, or 708. The apparatus 802 includes a transmission component 812 that refrains from transmitting a CSI report, such as described in 606.

In some implementations, the reception component 804 may receive DCI or downlink data. The reception component 804 may output an indication of the AP-CSI-RSs. In response to receiving the indication, the transmission component 812 may refrain from transmitting an AP-CSI report.

In an implementation, the determination component 806 may receive a time gap such as the time gap 510. The determination component 806 may determine whether the time gap is greater than or equal to a threshold time gap. If the time gap is greater than or equal to a threshold time gap, the determination component 806 may output an indication to the reception component 804 to receive the downlink data via a PDSCH channel configured based on at least one of the plurality of AP-CSI-RSs. If the time gap is smaller than the threshold time gap, the determination component 806 may output an indication to the reception component 804 to receive the downlink data via a PDSCH channel that is not configured based on the plurality of AP-CSI-RSs.

In some implementations, the refinement component 808 may receive beam performance parameters (such as signal to noise ratio) of the beams associated with receiving the AP-CSI-RSs. The refinement component 808 may select a beam based on the beam performance parameters.

In an implementation, the channel component 810 may receive channel properties of the downlink channels associated with the AP-CSI-RSs. The channel component 810 may update channel parameters based on the channel properties.

The apparatus may include additional components that perform each of the blocks of the algorithm in the aforementioned flowcharts of FIGS. 6 and 7. As such, each block in the aforementioned flowcharts of FIGS. 6 and 7 may be performed by a component and the apparatus may include one or more of those components. The components may be one or more hardware components specifically configured to carry out the stated processes/algorithm, implemented by a processor configured to perform the stated processes/algorithm, stored within a computer-readable medium for implementation by a processor, or some combination thereof.

Figure 9:
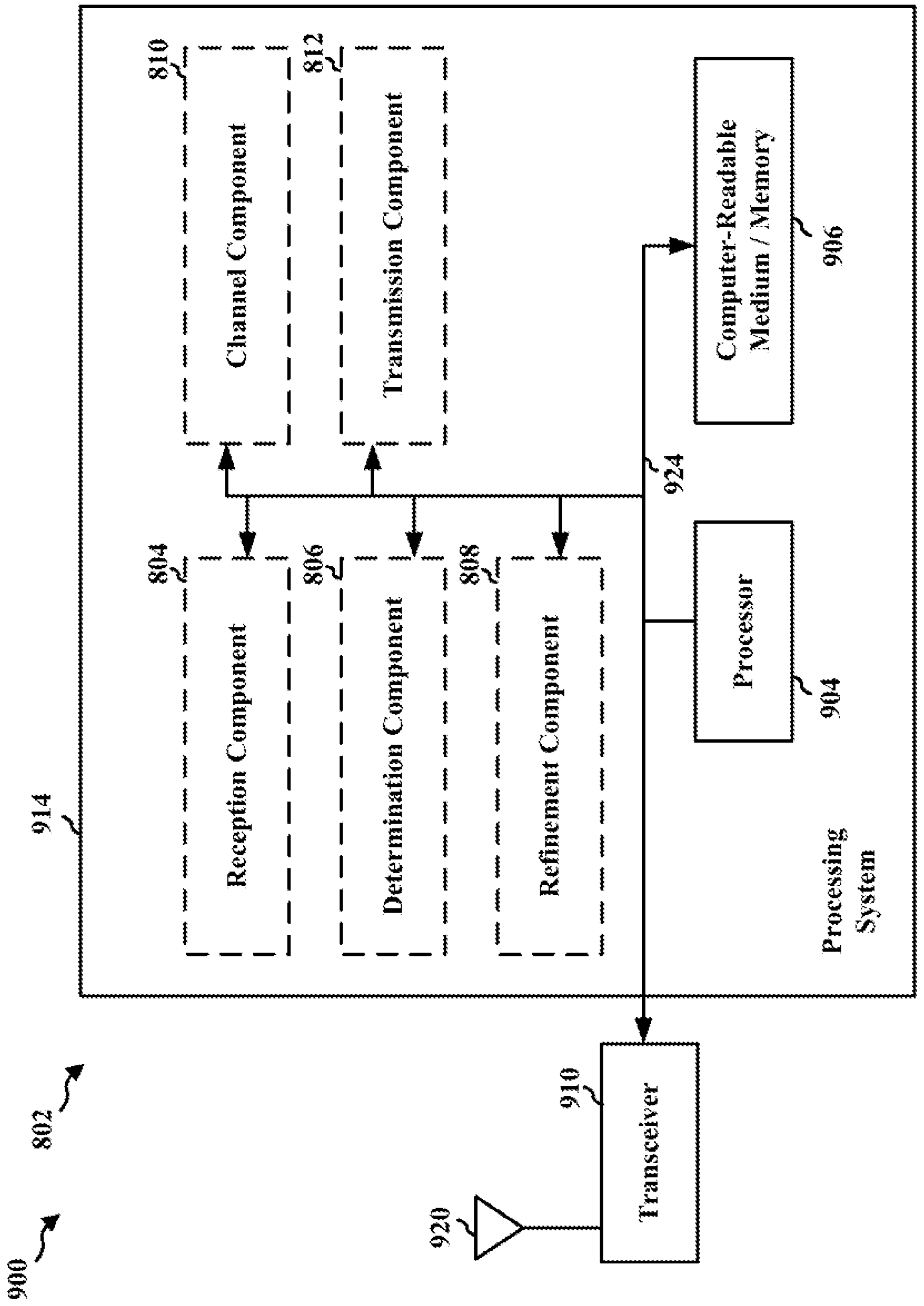
FIG. 9 is a diagram illustrating an example of a hardware implementation for an apparatus employing a processing system in accordance with some aspects of the present disclosure.

FIG. 9 is a diagram 900 illustrating an example of a hardware implementation for an apparatus 802 employing a processing system 914. The processing system 914 may be implemented with a bus architecture, represented generally by the bus 924. The bus 924 may include any number of interconnecting buses and bridges depending on the specific application of the processing system 914 and the overall design constraints. The bus 924 links together various circuits including one or more processors or hardware components, represented by the processor 904, the components 804, 806, 808, 810, 812, and the computer-readable medium/memory 906. The bus 924 may also link various other circuits such as timing sources, peripherals, voltage regulators, and power management circuits.

The processing system 914 may be coupled to a transceiver 910. The transceiver 910 is coupled to one or more antennas 920. The transceiver 910 provides a means for communicating with various other apparatus over a transmission medium. The transceiver 910 receives a signal from the one or more antennas 920, extracts information from the received signal, and provides the extracted information to the processing system 914, specifically the reception component 804. In addition, the transceiver 910 receives information from the processing system 914, specifically the transmission component 812, and based on the received information, generates a signal to be applied to the one or more antennas 920. The processing system 914 includes a processor 904 coupled to a computer-readable medium/memory 906. The processor 904 is responsible for general processing, including the execution of software stored on the computer-readable medium/memory 906. The software, when executed by the processor 904, causes the processing system 914 to perform the various functions described herein for any particular apparatus. The computer-readable medium/memory 906 may also be used for storing data that is manipulated by the processor 904 when executing software. The processing system 914 further includes at least one of the components 804, 806, 808, 810, 812. The components may be software components running in the processor 904, resident/stored in the computer readable medium/memory 906, one or more hardware components coupled to the processor 904, or some combination thereof. The processing system 914 may be a component of the UE 350 and may include the memory 360 or at least one of the TX processor 368, the RX processor 356, and the controller/processor 359. Alternatively, the processing system 914 may be the entire UE (such as UE 350 of FIG. 3).

In some aspects, the computer readable medium/memory 906 may be a non-transitory computer readable medium that store instructions to be executed by the processor 904.

In one configuration, the apparatus 802 for wireless communication includes means for receiving DCI indicating a first transmission of a plurality of AP-CSI-RSs and a second transmission of downlink data, means for receiving the plurality of AP-CSI-RSs and the downlink data, the reception of the plurality of AP-CSI-RSs indicating to the UE to transmit an AP-CSI report based on receiving the plurality of AP-CSI-RS s, means for refraining from transmitting an AP-CSI report in response to receiving the plurality of AP-CSI-RSs based on determining to disregard the indication to transmit the AP-CSI report, means for performing a UE receive beam refinement process on one or more UE reception beams based on the plurality of AP-CSI-RSs, wherein the downlink data is received using at least a portion of the one or more UE reception beams after the UE reception beam refinement process, means for determining one or more QCL channel properties of a QCL channel based on the plurality of AP-CSI-RSs, wherein the QCL channel is quasi-co-located with a PDSCH for receiving the downlink data, means for determining one or more PDSCH channel properties of the PDSCH channel based on the one or more QCL channel properties, means for updating one or more PDSCH channel parameters based on determining the one or more PDSCH channel properties, wherein the downlink data is received via the PDSCH channel after updating the one or more PDSCH channel parameters, means for determining whether a time gap between the last AP-CSI-RS of the plurality of AP-CSI-RSs and the first resource of the downlink data is greater than, equal to, or less than a threshold time gap, means for receiving, based on the time gap being greater than or equal to the threshold time gap, the downlink data via a PDSCH channel configured based on at least one of the plurality of AP-CSI-RSs, means for receiving, based on the time gap being less than the threshold time gap, the downlink data via a PDSCH channel that is not configured based on the plurality of AP-CSI-RSs. The aforementioned means may be one or more of the aforementioned components of the apparatus 802 or the processing system 914 of the apparatus 802 configured to perform the functions recited by the aforementioned means. As described herein, the processing system 914 may include the TX Processor 368, the RX Processor 356, and the controller/processor 359. As such, in one configuration, the aforementioned means may be the TX Processor 368, the RX Processor 356, and the controller/processor 359 configured to perform the functions recited by the aforementioned means.

The specific order or hierarchy of blocks in the processes/flowcharts disclosed is an illustration of example approaches. Based upon design preferences, the specific order or hierarchy of blocks in the processes/flowcharts may be rearranged. Further, some blocks may be combined or omitted. The accompanying method claims present elements of the various blocks in a sample order, and are not meant to be limited to the specific order or hierarchy presented.

The previous description is provided to enable any person of ordinary skill in the art to practice the various aspects described herein. Various modifications to these aspects will be readily apparent to those of ordinary skill in the art, and the generic principles defined herein may be applied to other aspects. The claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects. Unless specifically stated otherwise, the term "some" refers to one or more. Combinations such as "at least one of A, B, or C," "one or more of A, B, or C," "at least one of A, B, and C," "one or more of A, B, and C," and "A, B, C, or any combination thereof" include any combination of A, B, or C, and may include multiples of A, multiples of B, or multiples of C. Specifically, combinations such as "at least one of A, B, or C," "one or more of A, B, or C," "at least one of A, B, and C," "one or more of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. The words "module," "mechanism," "element," "device," and the like may not be a substitute for the word "means." As such, no claim element is to be construed as a means plus function unless the element is expressly recited using the phrase "means for."

What is claimed is:

1. A method of wireless communication by a user equipment (UE), comprising:
- receiving downlink control information (DCI) indicating a first transmission of a plurality of aperiodic (AP) channel state information (CSI) reference signals (AP-CSI-RSs) and indicating a second transmission of downlink data;
- receiving the plurality of AP-CSI-RSs and the downlink data, the reception of the plurality of AP-CSI-RSs indicating to the UE to transmit an AP-CSI report based on receiving the plurality of AP-CSI-RSs, wherein a last-in-time AP-CSI-RS of the plurality of AP-CSI-RSs is received before receiving a first orthogonal frequency division multiplexing (OFDM) symbol of the downlink data via a physical downlink shared channel (PDSCH) scheduled by the DCI; and
- refraining from transmitting the AP-CSI report indicated by the reception of the plurality of AP-CSI-RSs based on at least one of a change in a channel condition of the PDSCH for the downlink data or receiving the downlink data.

2. The method of claim 1, wherein the downlink data is associated with an ultra-reliable low-latency communication (URLLC) session.

3. The method of claim 1, wherein the DCI includes a downlink control indicator that indicates the first transmission of the plurality of AP-CSI-RSs.

4. The method of claim 1, wherein the DCI includes a radio resource control (RRC) parameter that indicates whether the UE is to perform a UE receive beam refinement process based on a time between a last-in-time AP-CSI-RS of the plurality of AP-CSI-RSs and receiving the downlink data exceeding a time gap or perform a PDSCH parameter update process based on the plurality of AP-CSI-RSs.

5. The method of claim 4, further comprising, based on the RRC parameter being a repetition parameter, performing the UE receive beam refinement process on one or more UE reception beams based on the plurality of AP-CSI-RSs, wherein the downlink data is received using at least a portion of the one or more UE reception beams after the UE reception beam refinement process.

6. The method of claim 4, further comprising, based on the RRC parameter being a tracking reference signal information (TRS-info) parameter:
- determining one or more quasi-co-located (QCL) channel properties of a QCL channel based on the plurality of AP-CSI-RSs, wherein the QCL channel is quasi-co-located with a PDSCH for receiving the downlink data; and
- updating one or more PDSCH channel parameters based on the one or more QCL channel properties, wherein the downlink data is received via the PDSCH channel after updating the one or more PDSCH channel parameters.

7. The method of claim 6, wherein the one or more PDSCH channel properties include at least one of a delay spread, a Doppler spread, an average delay, or a Doppler shift.

8. The method of claim 1, further comprising determining whether a time gap between the last AP-CSI-RS of the plurality of AP-CSI-RSs and the first resource of the downlink data is greater than, equal to, or less than a threshold time gap.

9. The method of claim 8, further comprising:
- receiving, based on the time gap being greater than or equal to the threshold time gap, the downlink data via a physical downlink shared channel (PDSCH) configured based on at least one of the plurality of AP-CSI-RSs; or
- receiving, based on the time gap being less than the threshold time gap, the downlink data via a physical downlink shared channel (PDSCH) that is not configured based on the plurality of AP-CSI-RSs.

10. A user equipment (UE), comprising:
- a memory comprising instructions;
- a transceiver; and
- one or more processors operatively coupled with the memory and the transceiver, the one or more processors configured to execute instructions in the memory to:
  - receive downlink control information (DCI) indicating a first transmission of a plurality of aperiodic (AP) channel state information (CSI) reference signals (AP-CSI-RSs) and indicating a second transmission of downlink data;
  - receive the plurality of AP-CSI-RSs and the downlink data, the reception of the plurality of AP-CSI-RSs indicating to the UE to transmit an AP-CSI report based on receiving the plurality of AP-CSI-RSs, wherein a last-in-time AP-CSI-RS of the plurality of AP-CSI-RSs is received before receiving a first orthogonal frequency division multiplexing (OFDM) symbol of the downlink data via a physical downlink shared channel (PDSCH) scheduled by the DCI; and
  - refrain from transmitting the AP-CSI report indicated by the reception of the plurality of AP-CSI-RSs based on at least one of a change in a channel condition of the PDSCH for the downlink data or receiving the downlink data.

11. The UE of claim 10, wherein the downlink data is associated with an ultra-reliable low-latency communication (URLLC) session.

12. The UE of claim 10, wherein the DCI includes a downlink control indicator that indicates the first transmission of the plurality of AP-CSI-RSs.

13. The UE of claim 10, wherein the DCI includes a radio resource control (RRC) parameter that indicates whether the UE is to perform a UE receive beam refinement process based on a time between a last-in-time AP-CSI-RS of the plurality of AP-CSI-RSs and receiving the downlink data exceeding a time gap or a PDSCH parameter update process based on the plurality of AP-CSI-RSs.

14. The UE of claim 13, wherein the one or more processors are further configured to, based on the RRC parameter being a repetition parameter, perform the UE receive beam refinement process on one or more UE reception beams based on the plurality of AP-CSI-RSs, wherein the downlink data is received using at least a portion of the one or more UE reception beams after the UE reception beam refinement process.

15. The UE of claim 13, wherein the one or more processors are further configured to, based on the RRC parameter being a tracking reference signal information (TRS-info) parameter:

determine one or more quasi-co-located (QCL) channel properties of a QCL channel based on the plurality of AP-CSI-RSs, wherein the QCL channel is quasi-co-located with a PDSCH for receiving the downlink data; and update one or more PDSCH channel parameters based on the one or more QCL channel properties, wherein the downlink data is received via the PDSCH channel after updating the one or more PDSCH channel parameters.

16. The UE of claim 15, wherein the one or more PDSCH channel properties include at least one of a delay spread, a Doppler spread, an average delay, or a Doppler shift.

17. The UE of claim 10, wherein the one or more processors are further configured to determine whether a time gap between the last AP-CSI-RS of the plurality of AP-CSI-RSs and the first resource of the downlink data is greater than, equal to, or less than a threshold time gap.

18. The UE of claim 17, wherein the one or more processors are further configured to:

receive based on the time gap being greater than or equal to the threshold time gap, the downlink data via a physical downlink shared channel (PDSCH) configured based on at least one of the plurality of AP-CSI-RSs; or receive based on the time gap being less than the threshold time gap, the downlink data via a physical downlink shared channel (PDSCH) that is not configured based on the plurality of AP-CSI-RSs.

19. A user equipment (UE), comprising:

means for receiving downlink control information (DCI) indicating a first transmission of a plurality of aperiodic (AP) channel state information (CSI) reference signals (AP-CSI-RSs) and indicating a second transmission of downlink data;

means for receiving the plurality of AP-CSI-RSs and the downlink data, the reception of the plurality of AP-CSI-RSs indicating to the UE to transmit an AP-CSI report based on receiving the plurality of AP-CSI-RSs, wherein a last-in-time AP-CSI-RS of the plurality of AP-CSI-RSs is received before receiving a first orthogonal frequency division multiplexing (OFDM) symbol of the downlink data via a physical downlink shared channel (PDSCH) scheduled by the DCI; and means for refraining from transmitting the AP-CSI report indicated by the reception of the plurality of AP-CSI-RSs based on at least one of a change in a channel condition of the PDSCH for the downlink data or receiving the downlink data.

20. The UE of claim 19, wherein the downlink data is associated with an ultra-reliable low-latency communication (URLLC) session.

21. The UE of claim 19, wherein the DCI includes a downlink control indicator that indicates the first transmission of the plurality of AP-CSI-RSs.

22. The UE of claim 19, wherein the DCI includes a radio resource control (RRC) parameter that indicates whether the UE is to perform a UE receive beam refinement process based on a time between a last-in-time AP-CSI-RS of the plurality of AP-CSI-RSs and receiving the downlink data exceeding a time gap or a PDSCH parameter update process based on the plurality of AP-CSI-RSs.

23. The UE of claim 22, further comprising, based on the RRC parameter being a repetition parameter, means for performing the UE receive beam refinement process on one or more UE reception beams based on the plurality of AP-CSI-RSs, wherein the downlink data is received using at least a portion of the one or more UE reception beams after the UE reception beam refinement process.

24. The UE of claim 22, further comprising, based on the RRC parameter being a tracking reference signal information (TRS-info) parameter:

means for determining one or more quasi-co-located (QCL) channel properties of a QCL channel based on the plurality of AP-CSI-RSs, wherein the QCL channel is quasi-co-located with a PDSCH for receiving the downlink data; and means for updating one or more PDSCH channel parameters based on the one or more QCL channel properties, wherein the downlink data is received via the PDSCH channel after updating the one or more PDSCH channel parameters.

25. The UE of claim 24, wherein the one or more PDSCH channel properties include at least one of a delay spread, a Doppler spread, an average delay, or a Doppler shift.

26. The UE of claim 19, further comprising means for determining whether a time gap between the last AP-CSI-RS of the plurality of AP-CSI-RSs and the first resource of the downlink data is greater than, equal to, or less than a threshold time gap.

27. The UE of claim 26, further comprising:

means for receiving, based on the time gap being greater than or equal to the threshold time gap, the downlink data via a physical downlink shared channel (PDSCH) channel configured based on at least one of the plurality of AP-CSI-RSs; or means for receiving, based on the time gap being less than the threshold time gap, the downlink data via a physical downlink shared channel (PDSCH) channel that is not configured based on the plurality of AP-CSI-RSs.

* * * * *